Patented Apr. 17, 1951

2,549,180

UNITED STATES PATENT OFFICE 2,549,180

DENTAL CEMENT

Jack De Ment, Portland, Oreg.

No Drawing. Application August 1, 1947,
Serial No. 765,627

2 Claims. (Cl. 106—35)

This invention relates to improved dental compositions of the cement variety for employment in cementing operations in dental restoration and prosthesis work, such as cementing inlays, crowns, bridges, orthodontic bands, dressing seals, temporary fillings, and liners or steps in cavities.

This invention is a continuation-in-part of my co-pending application entitled "Artificial Tooth Composition," filed January 25, 1947, Serial Number 724,479, now Patent No. 2,508,816.

It is an object of the present invention to provide an improved form of dental cement with the appearance of natural tooth enamel. In exposed filling work and cavity preparation it is important to closely duplicate the natural enamel and similar structures, and present day media frequently fall short in this regard.

It is among the objects of my invention to make available a cementitious medium for use within the tooth with mechanical, thermal and other similar characteristics very much like natural enamel. In present day compositions pain and discomfort may be caused when the dental composition is placed in direct contact with the soft tissue, pulp or canal portions and subenameline structure of the tooth, say in cavity work. Part of these undesirable features of the present art are due to the inherent nature of the materials comprising the composition. Thus the thermal properties of the present day compositions may be such as to provide imperfect insulation, expansion and conduction and other changes associated with temperature effects within the interior of a filled or worked tooth. The present art has summed to an imperfect duplication of what amounts to simulating the structure and composition of the soft tissue and hard tissue or enamel in jointure, with all the attendant special physicochemical properties characteristic of this jointure.

This invention relies upon prior art in respect to the fact that many of the presently used dental cements and similar compositions not only possess ease of working and compounding, but upon setting form hard compositions exhibiting the requisite structural strength and corrosion resistance necessary to withstand the rigors of time within the human mouth. Further, another characteristic of present-day cements is taken advantage of; namely, the fact that these compositions can be filled or loaded, to say several hundred per cent in excess with varied materials like whiteners, amalgam, pure metals such as tin and so on. As a matter of fact, loading a cement often means utilizing the cement merely as a mechanical and physical carrier for one or more substances possessing desirable properties. Frequently an organic material, such as a natural or synthetic resin is added to such a cement composition.

In view of what is believed to be the broadly new advance in the art of dental prosthesis set forth in the above-named co-pending application, using specially prepared natural tooth organ material, particularly tooth enamel from the human or an animal of bovine or similar kind, I have found that tooth organ material can be incorporated with dental cement compositions of the general kind and formulation now employed in the art with great improvement thereof insofar as appearance and cetain physicochemical properties are concerned.

Natural tooth enamel has never been synthesized, though it has been analyzed from time to time. Natural mammalian tooth enamel, such as that from man, varies from the mineral apatite, which it resembles, five, to topaz, eight, on Moh's hardness scale, being by far the hardest tissue in the body. The specific structure and hardness of natural tooth enamel render it brittle, which is particularly apparent when the enamel loses its foundation of sound dentine in the tooth organ. Enamel is cleavable and splits along the general direction of the enamel rods in cases of fracture or in cavity preparation. The crystalline structure of enamel is allied to that in the mineral apatite, and is believed to have small amounts of organic material present.

The color of enamel-covered crown in the tooth ranges from yellow-white to grey-white, depending upon the translucency and other factors, some of which are not known. The enamel exhibits a bright bluish-white or whitish fluorescence in ultraviolet light, and this characteristic is believed, with good reason, to account for its vital or life-like appearance. Yellowish colors are thought to owe color to thin layer formation and the color of the dentine beneath. The translucency may also be due to a high degree of calcification and greater homogeneity of the enamel. Grayish enamel or colored-teeth possess more opaque enamel, perhaps because of a lesser degree of calcification, so that the enameline structure is less homogeneous. In the enameline layer of the tooth, the enamel "prisms," which are actually a variety of hexagons crystallographically speaking and resemble apatite, are bonded together, possessing a width of between five-one thousandths and seven-one thousandths of an inch, and a length which corresponds to the thickness of the enamel on the tooth.

The present invention involves the isolation and subsequent use of particles of pure tooth enamel. This separation and isolation may be accomplished in several ways, but I have found the more convenient and preferable of these to be methods involving settling and separation by a heavy liquid.

Briefly, the whole tooth is broken into fragments, the pulp removed, the fat extracted, and the fragments dried at a temperature of 60 degrees centigrade. These dried fragments are then crushed to say 100 mesh, and this powder is introduced into a heavy liquid in a sedimentation funnel or tube of a kind well known in the art. At the end of between one and three hours, usually about one and one-quarter hours, the enamel is at the bottom and the crude dentine is at the top.

In more detail, I have found that the whole tooth, whether human or bovine or the like, is best subjected to a careful preliminary cleaning and bleaching treatment. The use of sodium peroxide solution or sodium hypochlorite solution suffices for removing discolorations and foreign surface material from the tooth material. In employing human teeth it is requisite to eliminate all teeth possessing metal or silver fillings, and also those teeth which present large areas of break-down, say from the effect of caries and the like.

Before crushing the tooth material or teeth into fragments, it is also preferred that the roots and adjacent structures be removed, say by cutting or the like. And in any crushing, pulverizing or comminuting treatment, it is very important to use implements, ball-mills, mortars and pestles and the like which are not made or fabricated of soft metal like iron. Certain of the enamel is sufficiently hard to bite out particles of metal, and ultimately provide an unsatisfactory product. Crushing and powdering implements may be of porcelain or ceramic material, or sapphire or the extremely hard synthetic carbide compositions which are often used for such work.

The bleaching treatment can also incorporate the use of five per cent sodium hydroxide solution, brief use of which enables rapid and facile removal of extraneous tissues. In bleaching, the usual amount of a wetting agent, like sodium dioctyl sulfosuccinate may expedite the action, though this is of course optional and up to the operator.

The fat is extracted by the addition of the ground or crushed tooth material to a mixture of equal parts absolute alcohol and ethyl ether or like solvent, such as dioxane, and vigorously agitating. After decanting the ether-alcohol liquid from the mixture, the tooth material will be relieved of fat and similar materials. Soxhlet extraction apparatus can also be used.

The fragments, after this step in treating, are then gently dried at about 60 degrees centigrade, say in a small oven. It is important to free this comminuted tooth organ material of water.

At this stage of the treatment, the comminuted tooth material possesses a light buff or whitish color, and it is a free flowing powder when sufficiently dry. The color is due to the mixture of enamel particles and a preponderance of dentine, cementum and the like.

The fragments are then crushed to a desired particle size, in general 100 mesh or less. The particle size is more or less dependent upon the requirements and properties expected and desired in the final product, and it is my preference to use particles of between 150 and 200 mesh, sometimes 200 mesh or finer.

The fine powder of say human tooth organ material is then introduced at the top or liquid surface of a sedimentation apparatus containing a heavy liquid. This liquid must possess a specific gravity of about 2.5, preferably 2.53 to 2.56. Of the number of such liquids that are known in the art, a conveniently prepared liquid is a mixture of bromoform and absolute alcohol. Thus, fifty parts by volume of bromoform and ten parts by volume of absolute alcohol yield a liquid which has a specific gravity of 2.53 at 25 degrees centigrade. In preparing such a liquid, it is either necessary to obtain bromoform free of the usual several per cent alcohol, or use commercial grade bromoform, which contains about four per cent alcohol, with a calculated amount of absolute alcohol to give a heavy liquid of the desired specific gravity. Such a liquid should be protected from light.

Whereas the afore-mentioned disclosure related to the isolation and separation of pure particles of human tooth enamel, I prefer in practice for a manufactured product the enamel of beeves, i. e., bovine tooth enamel. In this case I have found that the ordinary bromoform of the pharmaceutical market, or that containing 4 per cent or so of alcohol, as a preservative, can be effectively used as the heavy liquid without special treatment. Such grades of bromoform of commerce have a specific gravity of between 2.6 and 2.7 and bovine enamel appears to have a greater density than human enamel and therefore is separated by this liquid. When this form of bromoform is used, there is less probability of obtaining a faulty product, one which may be contaminated by traces of pulp, dentine or other non-enameline substance, which materials tend to impart a greyish cast to the product after a period of time.

After the powder is introduced into the sedimentation tube or funnel containing the heavy liquid, particles of enamel separate by settling to the bottom, whereas crude dentine remains at the top. The enamel particles are then removed from the apparatus, washed with absolute alcohol and thoroughly dried. They are then ready for use. If, however, the separated enamel particles do not possess a sufficiently light color, a further bleaching treatment may be rendered them, and they may also be further comminuted after separation.

The particle size of the enamel can range between particles with approximately the width of the enamel rods or prisms themselves up to particles several times this value. A meshed screen or sieve designated between 150 and 200, will permit the production of enamel particles with dimensions approximating the width of the natural rods or prisms in situ. Thus, a number 200 sieve with openings 0.0029 or 0.003 inch wide pass particles of approximately the same size as the width of such a crystal unit of the enamel in situ. In this invention, such particles are haphazardly arranged, contrasting to a columnate arrangement in situ; nevertheless, each exposed particle face, whether in the present invention or in the natural tooth enamel, is of very similar if not identical area.

I have found that purified and isolated tooth enamel in particular, as prepared by methods set forth as above, can be added to dental cement compositions of the present art, of which there are a large number and wide variety of compositions and formulations of which illustrations are given infra, with decidedly superior results and an improved product. The purified tooth enamel is uniformly mixed with the dry constituents of a dental cement powder before the liquid or setting agent is added for use. The amount of purified tooth enamel may vary widely, depending upon the nature and type of results and product desired. Thus for imparting the properties possessed by natural tooth enamel for use anywhere in the mouth, but especially when soft tissue is to be in contact with the cement, I prefer between 20 to 80 per cent tooth enamel. However, when an exposed filling or cavity preparation is to be made, where appearance is paramount, the ratio of dental cement powder or solid to solid tooth enamel powder may vary between 1:1 and 1:4, with good results. A mixture of one part dental cement powder and three parts, by volume, of tooth enamel powder, say of 100–200 mesh fineness, a versatile product is obtained.

In the present day dental cement whiteners like titanium dioxide may be added in small amounts to give a light appearance, or dyestuffs or coloring matters may be added in exceedingly minute amounts for tinting purposes, all of which knowledge is well known to those skilled in the art. In this invention, these may be added to the product before use, though in most cases I have found that they are not only optional but often undesirable since properly prepared tooth enamel powder fulfills practically every requirement for appearance, since it is nature's own material in a form very much like that of the enamel in situ and identical with enamel in situ insofar as compositional and appearance properties are concerned. This of course excludes the production of special tints and shades, for the "ground color" is adequately provided by the natural enamel particles.

The two favored cements presently employed in dentistry are the zinc and the siliceous cements. There are numerous variations in formulation, but in general zinc oxide or phosphate, in the case of the former, is triturated with a high gravity phosphoric acid solution or a zinc chloride solution or the like. The case of the so-called siliceous cements, which usually have an admixture of aluminum oxide, or other salt of this metal, like the phosphate along with silica, the cement powder is mixed with a phosphoric acid solution. In the case of this invention, it is preferred that the natural tooth enamel particles be mixed with either of the afore-mentioned cements so as to effect the objects hereinafter set out.

Typical compositions, weight in per cent, are given in the following tables:

ZINC OXIDE CEMENTS

| Powder | | Liquid | |
|---|---|---|---|
| ZnO | 70–100 | Specific gravity | 1.55–1.85 |
| $Bi_2O_3$ | 0–6 | $P_2O_5$ | 33–50 |
| MgO | 0–9 | $H_2O$ | 45–67 |
| $Fe_2O_3$ | 0–2 | $Al_2O_3$ | 4–6 |
| $Al_2O_3$ | 0–7 | $Na_2O$ | 0–3 |
| $SiO_2$ | 0–8 | | |
| $PO_4$ | 0–2 | | |

In the case of aluminum oxide, silica, and phosphate, in the above formulation for powder, all of these materials are optional, and may be entirely eliminated or substituted for by magnesia. Also at the option and requirements of the user, the iron oxide and bismuth oxide may be eliminated, since they impart tint, in favor of other tinting agents well known in the art, e. g., cadmium red, synthetic dyestuffs and the like.

SILICEOUS CEMENTS

| Powder | | Liquid | |
|---|---|---|---|
| $SiO_2$ | 25–45 | Specific gravity | 1.50–1.80 |
| $Al_2O_3$ | 27–40 | $P_2O_5$ | 35–45 |
| CaO | 4–13 | $H_2O$ | 44–70 |
| $Na_2O$ | 0–8 | $Al_2O_3$ | 4–6 |
| BeO | 0–16 | ZnO | 0–8 |
| $PO_4$ | 4–24 | | |

At room temperature, 20 degrees centigrade, the setting time for these cements varies between 9 and 78 minutes for the zinc oxide cements and between 5 and 12 minutes for the siliceous cements. At the option of the user, traces of fluoride, say in the form of NaF, can be incorporated with the powder, in accordance with the present concentration specifications for that element as regards its effect in inhibiting or preventing the caries syndrome.

Thus, representative dental cement composition consists in most instances of a liquid and a solid in powder form. As an example, 400 mesh, high-purity zinc oxide is ground in pebble or ball mills. The liquid consists of: zinc phosphate (1 pound), glacial phosphoric acid (20 ounces) and distilled water (10 ounces). This liquid, in being prepared, is carefully filtered through glass wool, and kept away from air and moisture. In use, the solid and liquid are mixed together, say in proportion of 3 to 1, but if the set is too fast, the liquid is evaporated until the desired speed of set is attained. If the set is too slow, small amounts of water are added until the desired value is obtained. In mixing, small amounts of powder are added to the liquid on a slab or plate.

Other examples of typical dental cement compositions include: Fairthorne's cement, which is made from 5 parts powdered glass, 4 parts powdered borax, 8 parts silicic acid, and 200 parts zinc oxide, which mixture of substances is very finely powdered and, before use, mixed with concentrated syrupy zinc chloride solution; Sorel's cement, which is made by mixing zinc oxide with half its bulk of fine sand, this mixture being thoroughly rubbed together in a mortar with a solution of zinc chloride of specific gravity 1.260 before use; and, phosphate cement, which is made from pure phosphoric acid which is concentrated by evaporation until it becomes semi-solid, mixed with aluminum phosphate and heated, and, for use, is mixed with zinc oxide to the consistency of putty.

Still another illustration of what is meant herein by the expressions "dental cement" and "dental cement composition" is a formulation used by mixing just before use, 1 gram of the powder and 0.2 cubic centimeters of the liquid: zinc acetate (0.1), zinc stearate (1.0), zinc oxide (70.0) and rosin (28.5), all parts by weight. The rosin is powdered, and mixed with an equal weight of zinc oxide until thoroughly mixed, and then the two materials are sifted through a 100 mesh sieve. The unsieved material is then reground with more zinc oxide and resifted until all the material has passed through the sieve. The other zinc salts are mixed with the zinc oxide and passed through a 100 mesh sieve. The liquid consists of eugenol (85) and cottonseed oil (15) all parts by volume.

Dental cements may be of the so-called "permanent" variety, intended for long-period use, or the so-called "temporary" variety, intended for use where other, more substantial cements or prosthetic material is to be employed. Whereas the above-given illustrations are for the more permanent kind, which may be said to also include one modern favorite in the art, the compound zinc oxyphosphate, the so-called temporary cements are not excluded from my invention. These temporary cements are usually of simple composition, such as zinc oxide worked with just enough eugenol to make the mass plastic and workable.

I claim:

1. As a new composition, for dental prosthesis, a cold-setting cement which comprises (a) an admixture with zinc oxide powder of approximately 20 to 80 per cent by weight of natural tooth enamel particles, said enamel particles being of approximately the diameter of natural tooth enamel rods, and (b) a liquid of specific gravity 1.5 to 1.85, said liquid comprising 33 to 50 per cent by weight of phosphorus pentoxide as phosphoric acid in 45 to 67 per cent by weight of water, whereby upon trituration of the said admixture, (a), in powder form, with the said liquid, (b), into a plastic, workable mass the said cold-setting cement is formed.

2. As a new composition, for dental prosthesis, a cold-setting cement which comprises (a) an admixture with a powder comprising roughly equal parts by volume of zinc oxide and silica of approximately 20 to 80 per cent by weight of natural tooth enamel particles, said enamel particles being of approximately the diameter of natural tooth enamel rods, and (b) a liquid of specific gravity of approximately 1.26, said liquid comprising a water solution of zinc chloride, whereby upon trituration of the said admixture, (a), in powder form, with the said liquid, (b), into a plastic, workable mass the said cold-setting cement is formed.

JACK DE MENT.

REFERENCES CITED

The following references are of record in the file of this patent:

UNITED STATES PATENTS

| Number | Name | Date |
| --- | --- | --- |
| 1,885,563 | Bormans | Nov. 1, 1932 |

FOREIGN PATENTS

| Number | Country | Date |
| --- | --- | --- |
| 943 | Great Britain | 1852 |
| 233,907 | Great Britain | 1925 |